United States Patent Office 3,028,424
Patented Apr. 3, 1962

3,028,424
PREPARATION OF DL-ORNITHINE
Granville Bruce Kline, Greenwood, Ind., assignor to Eli Lilly and Company, Indianapolis, Ind., a corporation of Indiana
No Drawing. Filed May 11, 1959, Ser. No. 812,095
3 Claims. (Cl. 260—534)

This invention relates to a novel method of synthesizing DL-ornithine.

The process provided by this invention comprises the catalytic hydrogenation of 1,4,5,6-tetrahydro-6-oxo-3-pyridazinecarboxylic acid with hydrogen and platinum oxide catalyst in an acidic medium. Under such conditions DL-ornithine is produced directly. The process of this invention can be illustrated by the following equation:

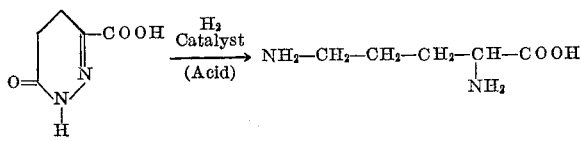

The novel process is carried out by hydrogenating in the presence of platinum oxide catalyst a dispersion of 1,4,5,6-tetrahydro-6-oxo-3-pyridazinecarboxylic acid in an acidic medium which is inert to the action of hydrogen. Useful inert acidic media include, for example, aqueous acetic acid, dilute hydrochloric acid, and the like. In the above-listed and similar dispersing media, the pyridazinecarboxylic acid is usually mostly insoluble, which, of course, requires that the hydrogenation be effected upon a mixture in which the bulk of the material is in suspension, but some is in solution. Preferably glacial acetic acid alone is used as a dispersant for the hydrogenation reaction, since it has a solvent action on the pyridazinecarboxylic acid and is also sufficiently acidic for the purpose of the reaction.

The catalyst employed for the hydrogenation is platinum oxide. The catalytic action is surprisingly specific, since other noble metal catalysts such as palladium, rhodium and ruthenium produce little or none at all of the desired ornithine. The weight of catalyst used is not critical. The amount of catalyst customarily used is about 10 percent by weight of the amount of pyridazinecarboxylic acid being hydrogenated. Either a larger or a smaller quantity of catalyst can be used, although when a smaller quantity is used, the hydrogenation proceeds less rapidly.

The hydrogenation can be effected over a wide range of temperatures. Preferably a temperature in excess of 100° C. is to be avoided to minimize side reactions. The pressure at which the hydrogenation is carried out is in no way critical. Superatmospheric pressure is desirable to promote a more rapid rate of hydrogenation than is realized with hydrogen at atmospheric pressure. A hydrogen pressure of about 30 pounds gives a suitably rapid rate of hydrogenation. In the event the hydrogenation is carried out at a relatively high pressure, e.g., 100 atm., the temperature preferably is kept below about 50° C. to restrict the formation of by-products to a minimum.

The hydrogenation is continued until the uptake of hydrogen ceases, which usually occurs when about the theoretical amount (4 mols) of hydrogen is taken up. The catalyst is then removed from the reaction mixture, and the ornithine is recovered, preferably in the form of an acid addition salt, by customarily applied isolation procedures.

This invention is further illustrated by the following examples.

EXAMPLE 1

Preparation of DL-Ornithine Hydrochloride 3 g. of 1,4,5,6-tetrahydro-6-oxo-3-pyridazinecarboxylic acid hemi-hydrate were dissolved in 200 ml. of glacial acetic acid. 1 g. of platinum oxide was added, and the mixture was placed in a pressure bottle which was in turn attached to a low pressure hydrogenation apparatus. The mixture was hydrogenated at ambient room temperature and at a hydrogen pressure of 50 p.s.i. After about the theoretical quantity of hydrogen had been absorbed and hydrogen uptake had ceased, the pressure bottle was removed from the apparatus, the catalyst was separated from the reaction mixture by filtration and the solvent was removed from the filtrate in vacuo. The residue comprising DL-ornithine acetate was dissolved in about 5 ml. of 12 N hydrochloric acid, to form DL-ornithine dihydrochloride. The solution was evaporated to dryness in vacuo and the residue of ornithine salt was dissolved in 13 ml. of ethanol to which 2.8 ml. of 14 N ammonia hydroxide had been added. The solid precipitate of DL-ornithine monohydrochloride which precipitated was separated by filtration. The precipitate was digested in 30 ml. of boiling ethanol for 10 minutes, was again collected by filtration, and the filter cake was washed with two 10 ml. portions of ethanol. Recrystallization of the filter cake yielded DL-ornithine mono-hydrochloride melting at about 226.5–227° C.

EXAMPLE 2

Preparation of DL-Ornithine Hydrochloride 3 g. of 1,4,5,6-tetrahydro-6-oxo-3-pyridazinecarboxylic acid hemi-hydrate were dissolved in 200 ml. of glacial acetic acid. 1 g. of platinum oxide was added and the mixture was hydrogenated at room temperature in a high pressure hydrogenation apparatus under a hydrogen pressure of about 1000 p.s.i. The DL-ornithine thus produced was isolated and purified as its monohydrochloride salt by the procedure described in Example 1.

I claim:

1. The method of preparing DL-ornithine which comprises hydrogenating 1,4,5,6-tetrahydro-6-oxo-3-pyridazinecarboxylic acid in the presence of platinum oxide catalyst at a temperature below about 100° C. in an acidic dispersing medium inert to the action of hydrogen.

2. The method of claim 1 in which glacial acetic acid is the dispersing medium.

3. The method of claim 1 in which glacial acetic acid is the acidic dispersing medium, and the hydrogenation is carried out at ambient room temperature and superatmospheric pressure.

References Cited in the file of this patent

UNITED STATES PATENTS 2,873,294     Kline _____ Feb. 10, 1959

OTHER REFERENCES

Berkman et al.: "Catalysis" (1940), pages 240–252.